May 24, 1938.   C. K. WOODMAN   2,118,483
INDICATING DEVICE FOR INDICATING SYNCHRONOUS OPERATIONS
Filed Sept. 26, 1936
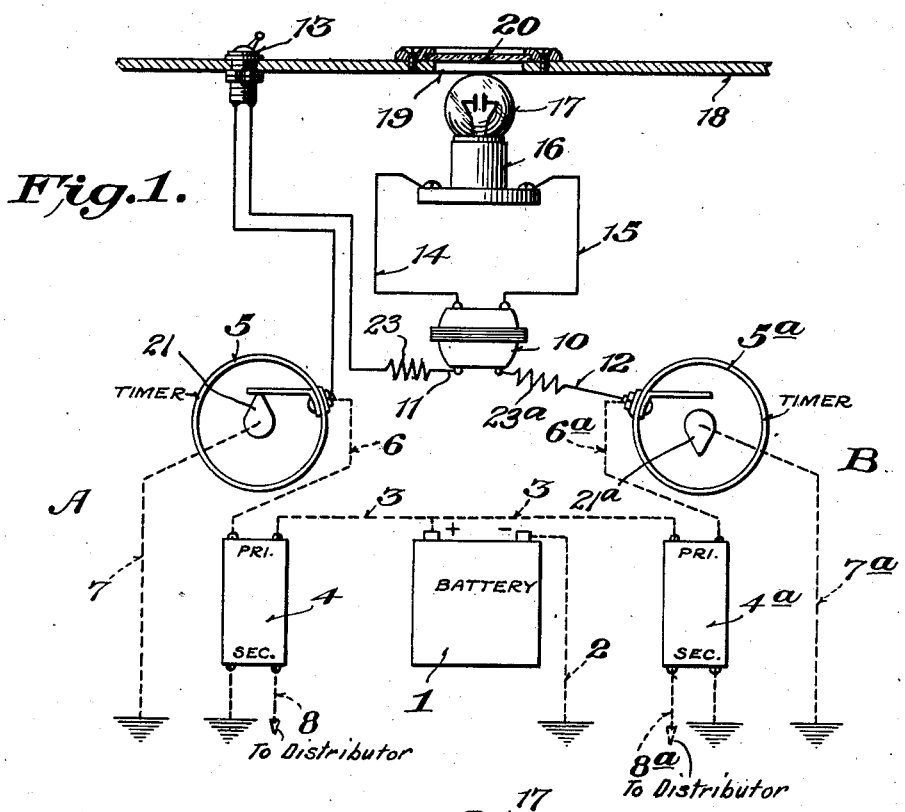
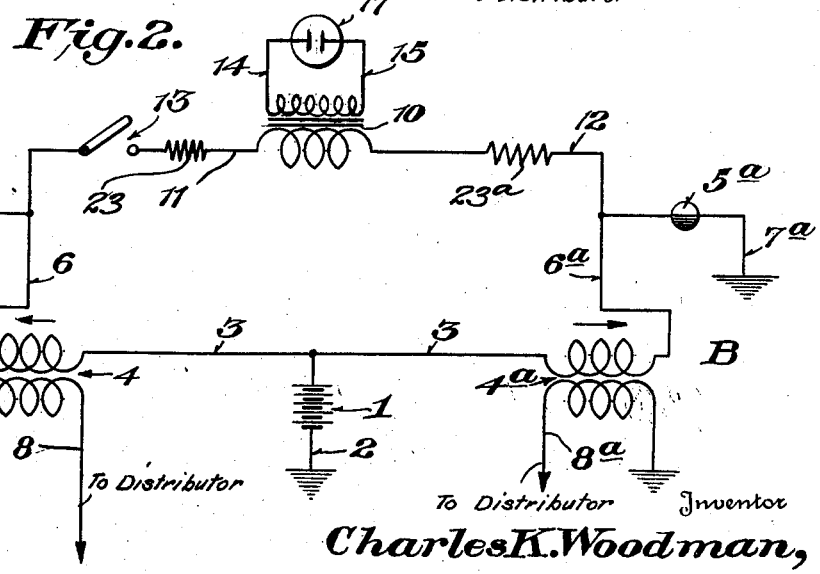
Charles K. Woodman,
Inventor Patented May 24, 1938

2,118,483

UNITED STATES PATENT OFFICE 2,118,483

INDICATING DEVICE FOR INDICATING SYNCHRONOUS OPERATIONS

Charles K. Woodman, Beverly, Mass., assignor to Huckins Yacht Corporation, Jacksonville, Fla., a corporation of Florida Application September 26, 1936, Serial No. 102,805

2 Claims. (Cl. 177—311)

My invention relates to an indicator for indicating synchronous operation of a plurality of internal combustion engines.

Indicators heretofore employed to indicate synchronous operation of internal combustion engines are generally complicated, invariably fragile and require frequent servicing and adjustment, of doubtful reliability, and costly to manufacture, having a number of moving parts.

Accordingly it is an object of my invention to provide an indicator which contains no moving parts and which requires little ability to install on the conventional ignition circuits of a plurality of internal combustion engines which are to be operated in synchronism. A further object is to provide an indicator which requires no initial adjustment, no servicing, is not subject to failure, and is made up of cheap materials which are readily obtainable.

Further objects and advantages of my invention will become apparent as the following specification proceeds, and the features of novelty which characterize my invention will be pointed out with particularity in the claims appended to and forming a part of this specification.

For a better understanding of my invention reference is had to the accompanying drawing, in which:

Fig. 1 is a diagram of the electric circuits and apparatus employed, and

Fig. 2 is a simplified electrical diagram of the electric circuits employed.

Referring to Fig. 1 of the drawing, there is shown my indicator associated with two conventional ignition circuits. The conventional ignition circuits are shown in dotted lines. Each of the ignition circuits comprises a spark coil 4 and 4a respectively and a timer 5 and 5a respectively. One terminal of the primary coil of each spark coil is connected by means of the branch conductor 3 to one terminal of the battery 1. The other terminal of the battery is grounded. The second primary terminal of the spark coil 4 is connected to the casing of the timer 5, the rotary contact member of which is connected to ground by means of the conductor 7. In a like manner the second primary terminal of spark coil 4a is connected by means of conductor 6a to the casing of timer 5a, the rotary contact member of which is connected to ground by means of conductor 7a.

It will be understood that spark coil 4 and timer 5 comprise a part of an ignition circuit A of one internal combustion engine (not shown) while spark coil 4a and timer 5a comprise a part of an ignition circuit B for a second engine (not shown). Each of the rotary contact members of timers 5 and 5a, is driven at a speed which is proportional to the speed of the engines of the ignition circuits A and B respectively.

My indicating apparatus, which is easily adapted to the ignition circuits of two conventional internal combustion engines which are to be operated in synchronism, is shown in solid lines in Fig. 1 of the drawing. This comprises a step-up transformer 10, one terminal of the primary of which is connected by conductor 12 to the casing of timer 5a. The other primary terminal of the transformer 10 is connected through conductor 11 and the switch 13 to the casing of timer 5. The circuit comprising conductors 11 and 12 preferably has a relatively high electrical resistance, either inherent in the circuit or in the form of a resistance element or elements such, for instance, as resistance elements 23 and 23a, which prevents the ignition circuit of one of the engines from igniting the other engine.

The secondary winding of transformer 10 is connected by conductors 14 and 15 to an electrical socket 16 into which there is connected lamp 17, preferably, a neon lamp. For convenience, lamp 17 may be positioned behind a panel 18, provided with an aperture 19 therein so that the light emanating from the lamp may pass through the panel. Further, the aperture may be provided with a piece of glass 20 therein to protect the lamp. Switch 13 may also be mounted upon panel 18 to provide a compact arrangement.

Referring to Fig. 2, the operations of the indicating and ignition circuits are as follows:

When the engine associated with the ignition circuit A is cranked and timer 5 is turned to make contact, an electric circuit is completed from ground through conductor 2, battery 1, conductor 3, the primary winding of ignition transformer 4, conductor 6, timer 5, and conductor 7 back to the ground. An electric current then flows through the above described circuit until timer 5 breaks the circuit. As the timer repeatedly makes and breaks the above described circuit during its normal course of operation, repeated surges of electric current flow through the primary winding of ignition transformer 4, inducing pulsating voltages in the secondary winding thereof, which supplies the usual distributor and spark-plugs in the side 8 of the ignition circuit A.

The operation of the ignition circuit B for the other engine is the same as that for engine A above described.

Although it is believed that the principle of operation of my device will be apparent to those skilled in the art, and a statement of the same not necessary to patentability, a brief explanation of the probable electrical operation is now given: As the contacts of one of the ignition timers open, an electrical surge is sent into the line of higher voltage than the mere battery voltage. This voltage surge is caused by the opening of a reactive circuit and by the capacitive discharge of the circuit. It is this surge that operates the neon lamp of this invention. It is, of course, a characteristic of the neon lamp to instantly glow upon the passage of current and almost instantly extinguish when the current ceases. If the two engines are running at different speeds, surges of two frequencies will thus be applied to the primary of the transformer 10. As long as these two surges are not in phase correspondence or phase opposition the lamps will be alternately lighted and extinguished with a frequency dependent upon the difference in speed of the two engines. Now if the engines are running at very nearly the same speed the irregularity of the glowing of the lamp decreases to a more uniform series of light and dark alternations. If the engines were running at the same speed, something which is difficult to accomplish in actual practice, the lamp would show a constant glow or be dark.

In operation, it has been found, that when the two engines are not running at the same speed the lamp blinks rapidly and irregularly—a fact subconsciously distinguishable to the eye. As the engines approach the same speed, caused by manipulation of one or both throttles, the irregularity decreases and the blink gives way to a slower beat of a more uniform series of light and dark alternations, thus indicating to the operator that he is moving his throttle in the correct direction. When the engines are running at exactly the same speed, the lamp remains as a steady light or is entirely extinguished. Since absolute synchronism is practically impossible, satisfactory results are obtained when the lamp remains on or off for periods of a few seconds. This has been found to be sufficient to eliminate the unpleasant beat note between the two engines of a boat or other installation.

Assuming that should absolute synchronous speed be obtained, if the angular relationship of the two timers 5 and 5a were such that the breaks occurred simultaneously, there should be two impulses of equal intensity travelling in opposite directions. In that case they would cancel one another and the lamp would remain dark. If on the other hand, the breaks were staggered such that they occurred alternately, first in one engine and then the other, the impulses would follow closely, first from one direction and then the other. As a result, due to persistency in the human eye, the lamp would appear to glow continuously, in the case of the modern relatively high speed engines. In the case of slow speed engines, the pulsations would appear visibly rhythmic and equally spaced to the human eye.

While I have illustrated and described one embodiment of my invention, modifications thereof will occur to those skilled in the art. I desire it to be understood, therefore, that my invention is not to be limited to the particular arrangement disclosed and I intend in the appended claims to cover all modifications which do not depart from the spirit and scope of my invention.

What I claim is:—

1. In a signaling system for indicating synchronous operation of two internal combustion engines, each having an ignition system including an ignition induction coil and primary circuit interrupter, the combination of an electrical signal device and a circuit connecting the signal device and both of the primary windings of the induction coils in series independently of said interrupters.

2. In a signalling system for indicating the speed of operation of an internal combustion engine having an ignition system including an ignition induction coil and primary circuit interrupter therefor, the combination of an electrical signalling device and a circuit connecting the signalling device and the primary winding of the induction coil in series independently of said interrupter.

CHARLES K. WOODMAN.